United States Patent [19]

Shults

[11] Patent Number: 4,729,413

[45] Date of Patent: Mar. 8, 1988

[54] TRANSPORT PUCK AND METHOD TO FILL CAULKING CARTRIDGES

[75] Inventor: Walter E. Shults, Scotia, N.Y.

[73] Assignee: General Electric Company, Waterford, N.Y.

[21] Appl. No.: 927,767

[22] Filed: Nov. 6, 1986

[51] Int. Cl.[4] .............................................. B65B 3/04
[52] U.S. Cl. .......................................... 141/2; 141/18; 141/98; 141/327; 141/370
[58] Field of Search ...................... 141/2, 18, 129–191, 141/250–284, 234–248, 98, 325, 326, 327, 369–381, 316, 390

[56] References Cited

U.S. PATENT DOCUMENTS

| | | | |
|---|---|---|---|
| 3,327,450 | 6/1967 | Carter | 53/61 |
| 3,941,237 | 3/1976 | MacGregor | 198/41 |
| 4,051,878 | 10/1977 | Ohemis et al. | 141/82 |
| 4,142,706 | 3/1979 | Mueller | 250/328 |
| 4,250,685 | 2/1981 | Elsworth et al. | 53/282 |
| 4,254,806 | 3/1981 | Elsworth | 141/116 |
| 4,305,496 | 12/1981 | Hoppmann et al. | 198/420 |
| 4,373,560 | 2/1983 | Elsworth | 141/242 |

OTHER PUBLICATIONS

The Geyer Filler Machine Company—Bulletin #207, Geyer Cartridge Filling Machines/specifications.

Primary Examiner—Houston S. Bell, Jr.
Attorney, Agent, or Firm—J. W. Harbour

[57] ABSTRACT

A transport puck for filling, handling and packaging caulking tubes is disclosed and the process steps involved therewith.

24 Claims, 3 Drawing Figures

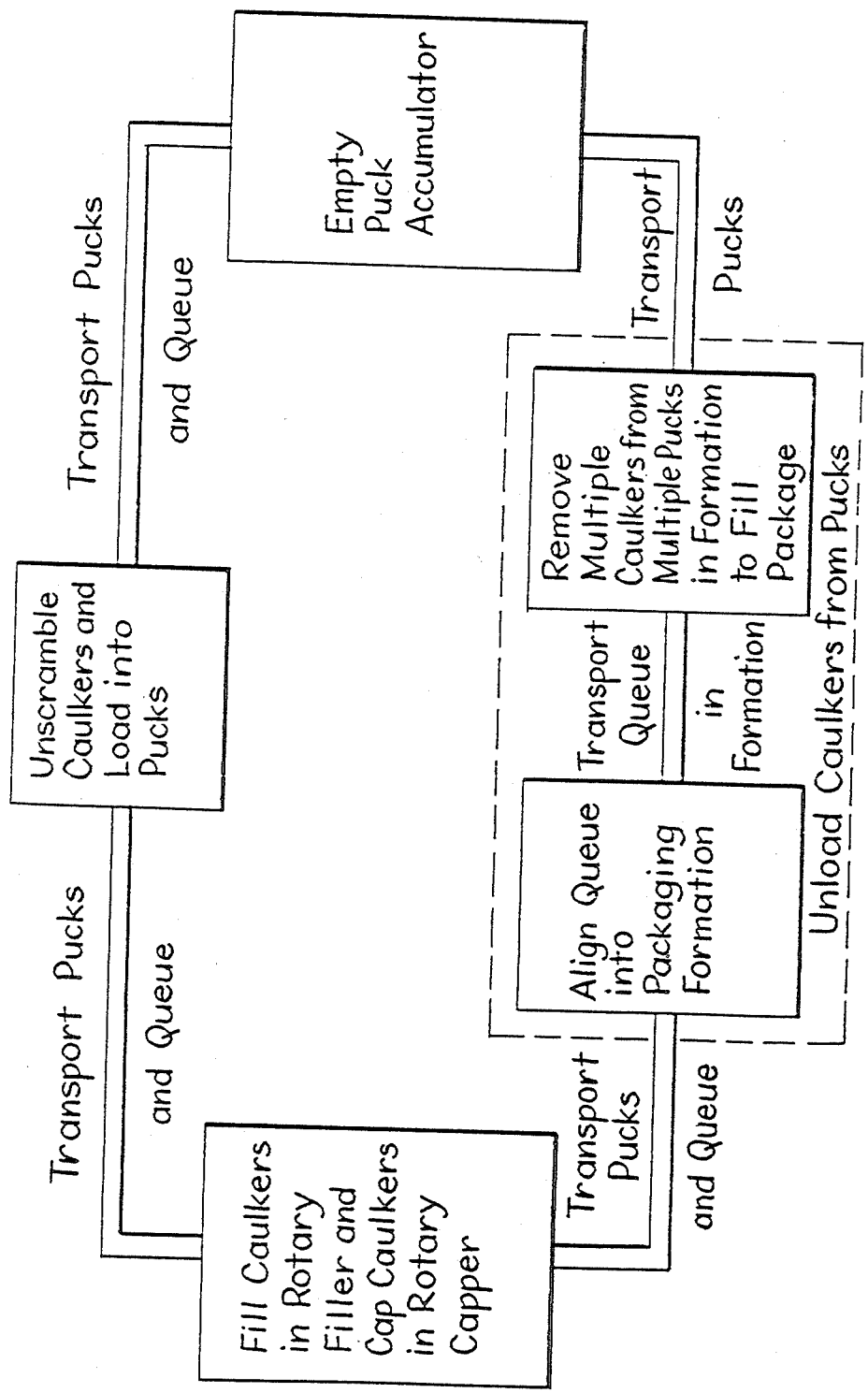

TRANSPORT PUCK AND METHOD TO FILL CAULKING CARTRIDGES

The present invention relates to a method for filling unstable elongated containers and to a transport puck suitable for use therein. More particularly, the present invention relates to a method for filling unstable elongated containers, i.e. caulking cartridges, wherein the containers are carried by transport pucks in vertical alignment.

BACKGROUND OF THE INVENTION

Caulking cartridges have been used for some time to easily handle and accurately dispense substances which are otherwise inconvenient for customer use. Employing a simple and inexpensive caulking gun, caulking cartridges may be loaded and the caulk applied without direct handling of this viscous material. Utilizing caulk and other materials of similar consistency from pails, cans, etc. requires comparatively expensive equipment for easy handling which cannot be justified by most consumers of these materials.

Although caulking cartridges may be necessary and convenient to facilitate consumer use, filling and handling these cartridges presents obvious packaging problems to the manufacturer. Their elongated shape in addition to a nozzle at one end gives them a high center of gravity when vertically aligned, particularly when vertically aligned in a nozzle down orientation. The high center of gravity is especially a problem when the cartridge is filled with the dense viscous material. Further, the dispensing nozzle protrudes from the cartridge at the only available flat surface on which the cartridge could be set during filling. These factors make it difficult to transport, fill and handle caulking cartridges by automated equipment.

U.S. Pat. Nos. 4,250,685 and 4,254,806 disclose an apparatus for filling caulking cartridges where the empty cartridges are loaded into a cup-like recepticle which is secured to a continuous belt while in horizontal alignment, filled and capped while vertically aligned nozzle down, and unloaded when again in horizontal alignment onto a means to convey in horizontal alignment. The cartridges are transported in the vertically aligned position only for so long as they are on the filling and capping apparatus.

Obviously, a method for filling the cartridges which repeatedly manipulates the cartridge itself is going to fail frequently. Crushed cartridges, down time, and a great deal of expended manpower are the result of such failures. Further, in the above described method, down time on the loading device directly leads to down time on the filler and capping apparatus. Even where the loading device fails to fill a single recepticle, then that portion of filler capacity is lost.

It is an object of the present invention to reduce caulking cartridge handling in the filling and packaging process.

It is another object of the present invention to fully utilize available capacity of a caulking cartridge filling and packaging apparatus.

It is still another object of the present invention to develop a transport puck for transporting caulking cartridges in vertical alignment.

It is another object of the present invention to develop a method for filling and packaging caulking cartridges which reduces down time, better utilizes available capacity, reduces damaged cartridges, and reduces expended manpower.

BRIEF DESCRIPTION OF THE DRAWINGS

FIG. 3 is a flow diagram of the filling and packaging process of the present invention.

DETAILED DESCRIPTION OF THE INVENTION

Figure 1:
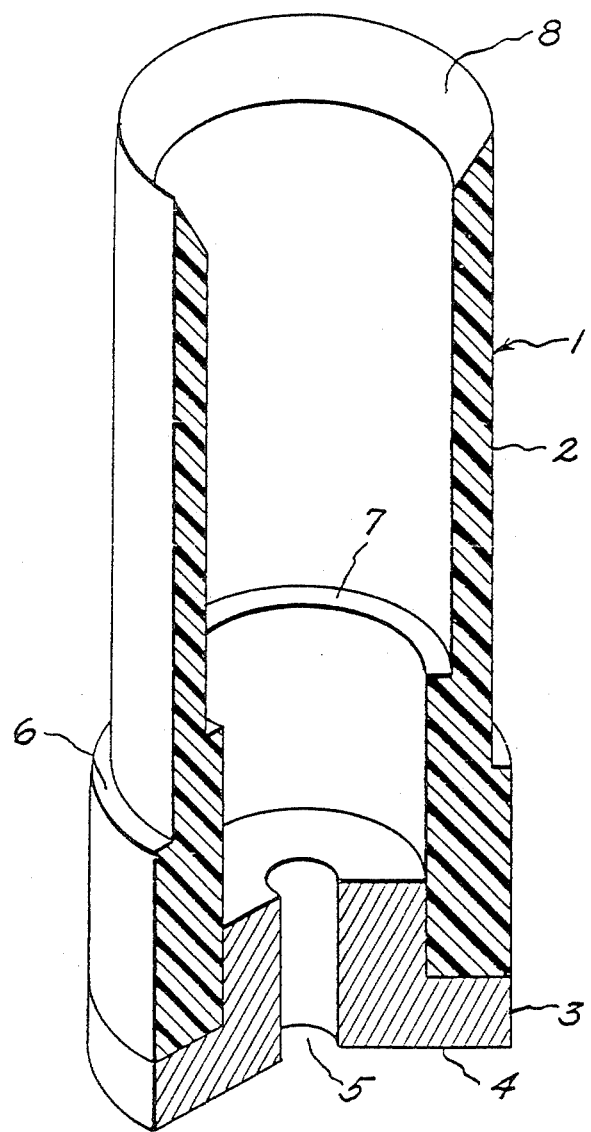
FIG. 1 is an isometric view, partially broken away, of an embodiment of the transport puck of the present invention.
Figure 2:
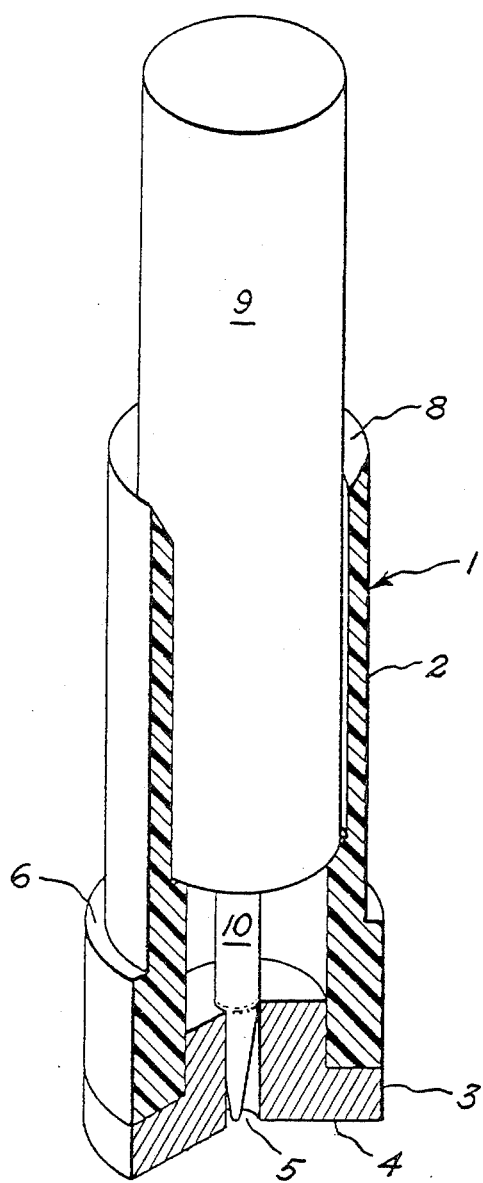
FIG. 2 is an isometric view, partially broken away, of an embodiment of the transport puck containing a caulking cartridge in verticle alignment.

Briefly, according to the present invention, there is provided a method for filling caulking cartridges and a transport puck for use in the same, the method comprising the steps of:
(a) vertically aligning the cartridge in a transport puck, nozzle down, by means of an apparatus to unscramble and load, the puck comprising:
  (i) a substantially solid lower portion, having a bottom face for stable contact with level planar surfaces, and attached thereto, opposite the bottom face,
  (ii) an upper sleeve shaped to receive the caulking cartridge in the desired alignment, wherein said lower portion has sufficient weight and said bottom face has sufficient breadth to maintain the center of gravity of the puck and a filled cartridge, below a plane passing through any single fulcral point or edge of the bottom face and extending upward through the sleeve from the level planar surface at an angle of about 60°;
(b) transporting the puck to an apparatus for filling the caulking cartridge; and
(d) filling the cartridge.

The transport puck 1 comprises a substantially solid lower portion 3 and an upper sleeve 2. Preferably, the upper sleeve is separate from the lower portion and the two are joined by means for joining such as adhesives, screws, snaps and other suitable fastening devices.

The primary functions of the lower portion 3 of the transport puck 1 is to provide a surface for stable contact with a substantially level planar surface and to control the center of gravity of the combination of puck 1 and caulking cartridge 9. Thus, the lower portion should have a bottom face 4 which is either flat, grooved, concave etc. so long as planar contact is made with definable fulcral points. Obviously, the bottom face 4 should not be convex and is preferably a flat smooth surface.

The bottom face 4 must have sufficient breadth and the bottom portion 3 must have sufficient weight to maintain the center of gravity of the puck 1, including a filled caulking cartridge 9 low enough that the puck 1 does not easily tip in processing. Generally, the center of gravity should be maintained below a plane passing through any single fulcral point or edge of the bottom face and extending upward through the sleeve from the level planar surface at an angle of about 60° C.

The bottom portion 3 is preferably made from materials having a specific gravity of greater than about 2. A high specific gravity makes it more convenient to lower the center of gravity with as compact a lower portion 3 as possible. Preferably, the lower portion is made of metal or filled plastic. In the embodiment shown, the lower portion 3 has a hole 5 into which the nozzle 10 of caulking cartridge 9 may extend upon loading. This permits caulking cartridge 9 to sit lower in transport puck 1 and thus lowers the center of gravity.

Attached to the bottom portion 3 opposite its bottom face 4 is the upper sleeve 2. The primary function of the upper sleeve 2 is to receive and secure the caulking cartridge 9 in the desired alignment. Thus, the upper sleeve 2 should generally define a cylinder which is open at the end opposite the bottom portion 3 to receive the caulking cartridge 9. The upper sleeve 2 may have a solid or perforated wall or the upper sleeve 2 may be defined by ribs which extend from the substantially solid lower portion 3 to define an opening. The upper sleeve 2 also may have guiding and spacing surfaces. Guiding surface 8 is inclined toward the opening so as to guide a falling caulking cartridge 9 into the transport puck 1 as appropriate. Surface 7 is provided as a seat for caulking cartridge 9 once loaded into transport puck 1 and surface 6 provides for proper spacing of the transport puck 1 where queued, particularly queued in formation.

The upper sleeve 2 is preferably made from materials having a specific gravity less than about 2. A low specific gravity makes it more convenient to lower the center of gravity with as compact a lower portion 3 as possible. Preferably, the upper sleeve 2 is made of plastic, such as polyolefin, polyester, and the like or possibly wood.

In order to achieve a low center of gravity the lower portion should have the majority of the weight of the transport puck 1. It is preferred that the weight ratio of the upper sleeve 2 to the lower portion 3 should be at most about ⅔. In practice this ratio should be as low as possible. A full caulking cartridge 9 with its rather elongated shape and nozzle 10 will raise the center of gravity considerably upon insertion into the transport puck 1. However, in spite of the desire to have this weight ratio as low as possible, the elongated shape of the caulking cartridge 9 requires that the height of the upper sleeve 2 be a major portion of the transport puck 1. Thus, it is preferred that the upper sleeve 2 to lower portion 3 height ratio is at least about 3/2.

According to the method of the present invention, empty caulking cartridges 9 are stored in a bin and fed by gravity, belt or otherwise to an apparatus to unscramble and load the caulking cartridges 9 nozzle down into transport pucks 1. The specifics of the apparatus to unscramble and load are not critical to the instant invention. Many designs are possible. In the present invention the cartridges are spilled onto an inclined and vibrating surface with slots or channels the width of a cartridge running in the direction of incline. The vibrating action moves the cartridges down the incline while at the same time placing them in a slot with nozzle pointing either up or down the incline. At the edge of the vibrating surface, the cartridges that are nozzle down are simply allowed to fall into a chute which places the cartridge in a transport puck passing below. Those cartridges which are oriented nozzle up are detected and caught at the open end as they extend off the edge of the vibrating surface. Catching and holding the cartridge at the open end allows the nozzle end to fall off the vibrating surface whereupon the open end is released and the cartridge falls down the chute in nozzle down orientation.

The transport puck 1, once loaded, is transported to an apparatus for filling the caulking cartridge 9 and queued at the entrance of the apparatus for filling. The means of transport may vary, depending upon the design of the transport puck 1 but is not now hindered by the design of caulking cartridge 9. In the case of the present embodiment, the transport means are tables with roller surfaces. The rollers are closely packed and set on axis which run the width of the table and which are driven by chain, belt, or otherwise from one or both edges of the table. The transport pucks 1 are carried on the rollers down the length of the table.

Transport pucks 1 are queued on these tables upon reaching the entrance of, for example, the apparatus for filling where there are already other transport pucks 1 waiting to be filled. To properly queue the transport pucks 1 on the rolling surface, it is important to control the coefficient of sliding friction between the bottom face 4 of lower portion 3 and the surface of the rollers. Too high a coefficient will cause the transport pucks 1 to jostle one another and overturn. Too low a coefficient will make the movements of the transport puck 1 sluggish and will not press the queue hard enough to break jams and the like which may occur.

The presence of the queue at the entrance of the apparatus for filling insulates this apparatus from temporary problems with unscrambling and loading. This is important to the present invention in that such problems will inevitably occur, given the unwielding nature of the caulking cartridge 9. Further, an improperly loaded transport puck 1 will stand in the queue for some amount of time before uselessly monopolizing filler capacity. Such transport puck 1 may be removed or corrected by the operator at this point rather than at some later time.

The loaded transport pucks 1 enter the queue, stand in the queue, converge to single file and are taken up by the apparatus for filling. Although not critical, in the present embodiment, the filler is a rotary filler which accepts the transport puck 1 from single file. The rotary filler fills the caulking cartridge 9 while rotating it through something less than 360° around the outside diameter of a circular housing. Filling is accomplished by inserting a male nozzle into the open end of the caulking cartridge 9 and filling the caulking cartridge 9 while withdrawing the male nozzle.

Capping the caulking cartridge 9 may be done immediately off the filler or the transport pucks 1 may be transported and queued to an apparatus for capping. Preferably the caulking cartridge 9 is immediately capped as it comes off the filling apparatus.

Subsequent to capping, the transport puck 1 is transported to an apparatus for removing the caulking cartridge 9. Of course, the transport puck 1 should again be queued at the entrance to the apparatus for removing in order to insulate this apparatus from temporary down time in the other components. It is preferred that the caulking cartridges 9 be removed from transport pucks 1 in formation to fill a package or container. For example, where a package holds 36 caulking cartridges, arranged in 6 columns and 6 rows. The queue at the entrance to the apparatus for removing should be aligned into 6 columns. The 6 column queue is then transported in formation with 6 rows at a time being admitted into the removing apparatus. Multiple caulking cartridges, i.e. 36, caulking cartridges are removed by lifting from multiple transport pucks 1 and lowered into the package as a unit.

The empty transport pucks 1 are released from the apparatus for removing and transported to an accumulator where they are accumulated. From the accumulator, the transport pucks 1 are metered, depending on production rate, and transported to the apparatus to unscramble and load. Again, it is preferred that the empty transport pucks 1 are queued at the entrance to the apparatus to unscramble and load.

It is apparent that multiple unscrambling and loading apparatus, filling or capping apparatus, or unloading apparatus can be conveniently incorporated into a single line. Thus, capacity can be expanded or contracted as needed without commensurate expansions or contractions in terms of the fixed facilities or manpower.

Other embodiments will occur to those skilled in the art which are within the scope of the following claims.

What is claimed is:

1. A transport puck to vertically align a caulking cartridge, nozzle down said puck comprising:
    (a) a substantially solid lower portion, having a bottom face for stable contact and frictional engagement with level planar surfaces, and attached thereto, opposite said bottom face,
    (b) an upper sleeve, shaped to receive said caulking cartridge in the desired alignment.
wherein said lower portion has sufficient weight and said bottom face has sufficient breadth to maintain the center of gravity of said puck and a filled caulking cartridge, below a plane passing through any single fulcral point or edge of said bottom face and extending upward through said sleeve from said level planar surface at an angle of about 60°.

2. The transport puck of claim 1 wherein said sleeve comprises solid or perforated walls defining an opening above said lower portion to receive said container.

3. The transport puck of claim 1 wherein said sleeve comprises ribs defining an area above said lower portion to confine said container.

4. The transport puck of claim 1 wherein said lower portion comprises materials having a specific gravity greater than about 2.

5. The transport puck of claim 1 wherein said upper sleeve comprises materials having a specific gravity of less than 2.

6. The transport puck of claim 1 wherein the upper sleeve to lower portion weight ratio is at most about ⅔.

7. The transport puck of claim 1 wherein the upper sleeve to lower portion height ratio is at least about 3/2.

8. The transport puck of claim 4 wherein said lower portion comprises materials selected from the group consisting of metal filled plastic.

9. The transport puck of claim 5 wherein said upper sleeve comprises materials selected from the group consisting of plastic and wood.

10. The transport puck of claim 1 wherein the ratio of maximum height to maximum width exceeds about 1/1.

11. A method for filling a caulking cartridge comprising the steps of:
    (a) vertically aligning said cartridge in a transport puck, nozzle down, by means of an apparatus to unscramble and load said puck comprising
        (i) a substantially solid lower portion, having a bottom face for stable contact and frictional engagement with level planar surfaces, and attached thereto, opposite said bottom face,
        (ii) an upper sleeve, shaped to receive said caulking cartridge in the desired alignment,
    wherein said lower portion has sufficient weight and said bottom face has sufficient breadth to maintain the center of gravity of said puck and filled caulker, below a plane passing through any single fulcral point or edge of said bottom face and extending upward through said sleeve from said level planar surface at an angle of about 60°;
    (b) transporting said puck to an apparatus for filling said caulking cartridge; and
    (d) filling said cartridge.

12. The method of claim 11 wherein said sleeve of said puck comprises solid or perforated walls defining an opening above said lower portion to receive said container.

13. The method of claim 11 wherein said sleeve of said puck comprises ribs defining an area above said lower portion to confine said container.

14. The method of claim 11 wherein said lower portion of said puck comprises materials having a specific gravity greater than about 2.

15. The method of claim 11 wherein said sleeve of said puck comprises materials having a specific gravity of less than 2.

16. The method of claim 11 wherein said sleeve to lower portion weight ratio is at most about ⅔.

17. The method of claim 11 wherein said sleeve to lower portion height ratio is at least about 3/2.

18. The method of claim 14 wherein said lower portion of said puck comprises materials selected from the group consisting of metal and filled plastic.

19. The method of claim 15 wherein said sleeve of said puck comprises materials selected from the group consisting of plastic and wood.

20. The method of claim 11 which further comprises the step of (c) queuing said puck at the entrance to said apparatus for filling.

21. The method of claim 11 which subsequent to said step of filling, further comprises the steps of:
    (e) capping said cartridge,
    (f) transporting said puck to an apparatus for removing said cartridge,
    (g) queuing said puck at the entrance to said apparatus for removing, and
    (j) removing said cartridge from said puck.

22. The method of claim 21 which prior to said step of removing further comprises the steps of:
    (h) aligning said queue at the entrance to said apparatus for removing into packaging formation, and
    (i) transporting said aligned queue in formation.

23. The method of claim 22 wherein said step of removing is characterized by removing multiple cartridges from multiple pucks of said aligned queue in formation to fill a package.

24. The method of claim 21 which subsequent to said step of removing, further comprises the steps of:
    (k) accumulating empty pucks in an accumulator,
    (l) transporting said pucks to said apparatus to unscramble and load; and
    (m) queuing said empty pucks at the entrance to said apparatus to unscramble and load.

* * * * *